United States Patent [19]

Hancock

[11] Patent Number: 4,680,997

[45] Date of Patent: Jul. 21, 1987

[54] VIDEO TAPE CASSETTE TOOL

[76] Inventor: LaVon F. Hancock, 5561 SE. Pueblo St., Hillsboro, Oreg. 97123

[21] Appl. No.: 839,558

[22] Filed: Mar. 14, 1986

[51] Int. Cl.⁴ .............................................. B25B 3/00
[52] U.S. Cl. ........................................ 81/487; 269/3; 269/909
[58] Field of Search ...................... 81/487; 269/47, 52, 269/909, 3, 254 R, 317, 16; 242/199; 248/309.1, 316.7, 231.8, 231.7, 210, 211, 238

[56] References Cited

U.S. PATENT DOCUMENTS

| 807,840 | 12/1905 | Martin et al. | 248/231.8 |
| 1,745,548 | 2/1930 | Lerner | 248/231.8 |
| 1,752,017 | 3/1930 | Metzger | 211/83 |
| 4,147,314 | 4/1979 | Traulsen | 242/199 |

Primary Examiner—Roscoe V. Parker
Attorney, Agent, or Firm—Dellett, Smith-Hill & Bedell

[57] ABSTRACT

A hand tool for holding a video tape cassette for inspection, repair and adjustment. The tool clamps conveniently onto the body of a conventional video cassette and includes a keeper for holding the spring-loaded tape shield of the cassette open. One embodiment of the tool includes a mechanism for releasing the reel locking mechanism inside the cassette.

16 Claims, 6 Drawing Figures

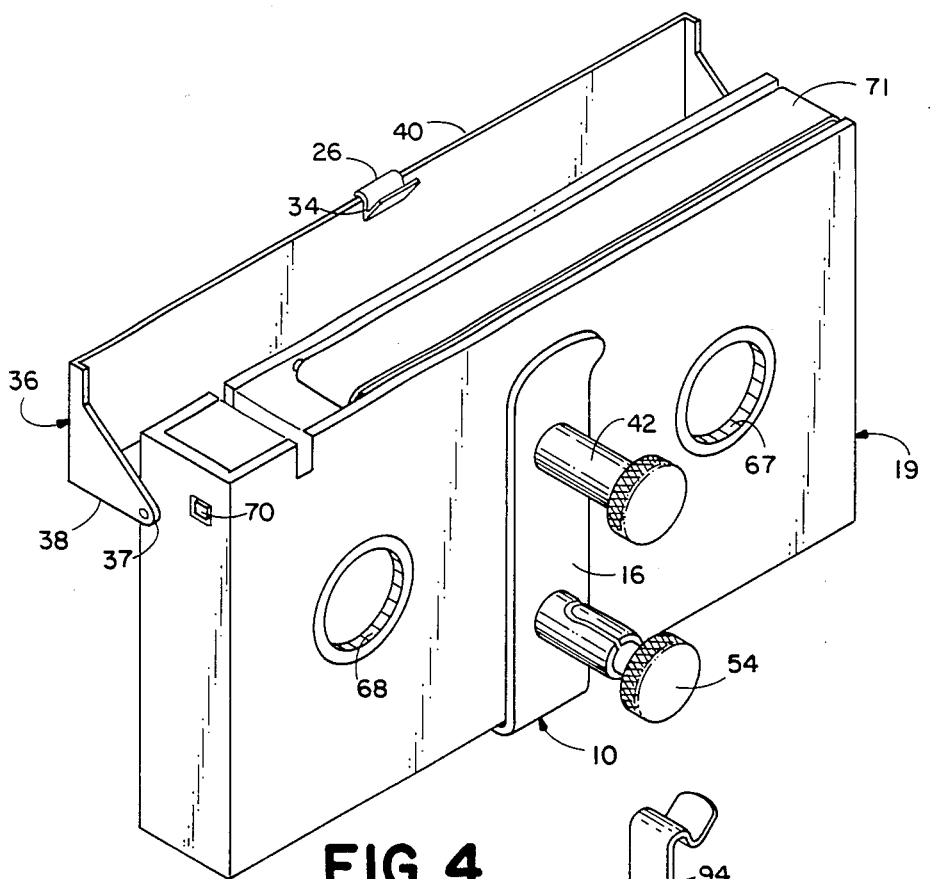
FIG. 4
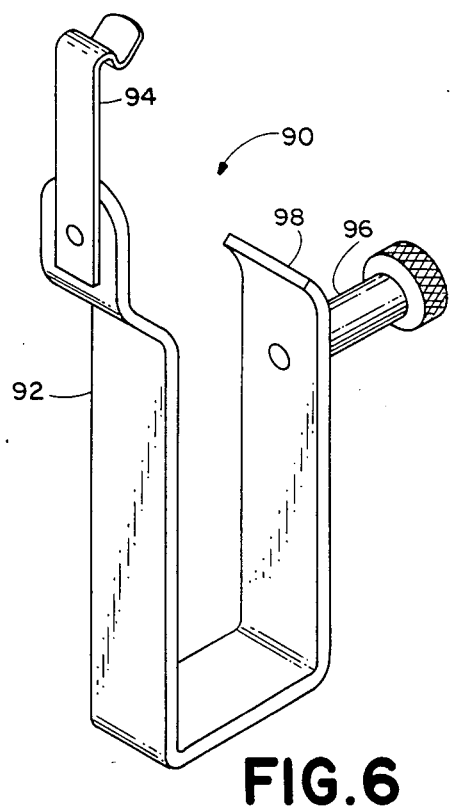
FIG. 5
FIG. 6

VIDEO TAPE CASSETTE TOOL

BACKGROUND OF THE INVENTION

This invention relates to tools for holding a workpiece, and more particularly, to a tool for holding a video tape cassette to facilitate inspection, repair and adjustment of the cassette.

A conventional video tape cassette comprises a polyethylene-base magnetic tape wound on a pair of reels inside a housing, and includes a closure or tape shield attached by hinges and under spring tension to the body of the cassette. The shield, normally locked into a position along one edge of the cassette housing for covering and protecting the video tape, can be manually unlocked and opened to expose the tape.

When the cassette is inserted into a video playback or recording machine, a mechanism in the machine releases the shield lock, swings the shield open and away from the video tape, and positions the cassette so that the tape, now exposed along one edge of the cassette, can be threaded into the machine and held against the video drum and audio heads. When the cassette is removed from the video machine, the shield, under spring tension, automatically closes and locks into place, covering and protecting the video tape from damage.

Conventional video-tape cassettes often include an internal mechanism for locking the tape reels when the cassette is removed from the video machine, thereby preventing the tape from becoming loose on the reels. When a cassette having reel locks is inserted into a video machine and positioned on the reel hubs for operation, a pin protruding from the machine is received into an aperture in the housing of the cassette, where the pin engages an unlocking mechanism inside the cassette, releasing the tape reels for movement by the machine.

After a period of use, the tape may become improperly tensioned, which can cause tape damage or breakage. Therefore it is beneficial to periodically release the tape reel locks and manually adjust tape tension. Video tape cassettes are also inspected periodically with use, and repaired or adjusted if required. To inspect, repair or retension a video tape cassette, it was heretofore necessary either to disassemble the cassette, or to release the shield-locking mechanism by hand, manually open and hold the shield to gain access to the video tape or the internal mechanisms of the cassette, and effect inspection, repair or adjustment while holding the shield open against spring tension. Furthermore, if the cassette included a reel locking device, it was necessary to release the reel locks manually by inserting a suitable rod or pin into the reel-lock aperture, while simultaneously holding the spring-loaded tape shield open, thus making inspection, repair or retensioning of the cassette cumbersome, time consuming and difficult.

Accordingly, it is an object of my invention to provide an improved tool for holding a workpiece.

It is another object of my invention to provide an improved tool for holding a video tape cassette while effecting inspection, repair and adjustment thereof.

Still another object of the invention is to provide an improved hand tool for holding open the tape shield of a video tape cassette while effecting inspection, repair or adjustment of the cassette.

It is another object of the invention to provide an improved tool for releasing the reel locks of a video tape cassette.

SUMMARY OF THE INVENTION

According to the present invention, in a preferred embodiment thereof, a hand tool having a generally U-shaped frame receives a video tape cassette slidably therein, and holds the cassette in a position such that a keeper affixed to the frame receives the opened tape shield of the video cassette and holds the shield open. A handle affixed to the frame facilitates sliding the cassette into the frame.

In a particular embodiment, a guide pin is provided interiorly of the frame for locating and aligning the cassette with respect to the tool. A lock-release assembly affixed to the frame of the tool includes a lock-release member insertable into the cassette housing for releasing the tape-reel lock mechanism of the cassette. A latch is provided for holding the lock-release member inside the cassette.

BRIEF DESCRIPTION OF THE DRAWINGS

While the invention is set forth with particularity in the appended claims, other objects, features, and method of operation of the invention will become more apparent, and the invention will best be understood by referring to the following detailed description in conjunction with the accompanying drawings in which:

FIG. 4 is a pictorial view of a video tape cassette installed in a tool according to the invention;

FIG. 5 illustrates a hand tool suitable for turning reel hubs of a video tape cassette; and FIG. 6 is an alternative embodiment of a video cassette tool in accordance with the invention.

DESCRIPTION OF THE PREFERRED EMBODIMENT

Figure 1:
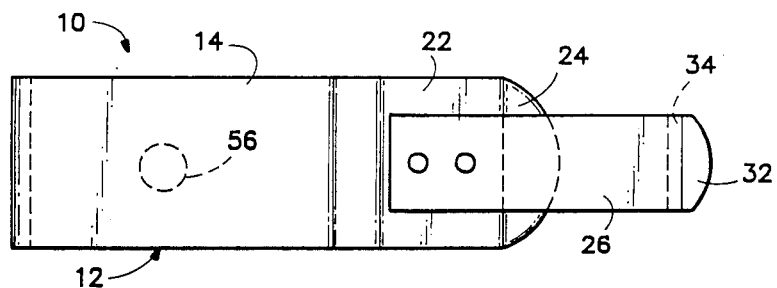
FIG. 1 is a top elevation of one embodiment of a video cassette tool in accordance with the present invention.

Referring now to FIGS. 1–4 of the drawings for a more detailed description of the construction, operation and other features of the instant invention by characters of reference, a tool 10 comprises a generally U-shaped frame 12 having a first leg 14 and a second leg 16 extending from a base 18. The legs 14, 16 are generally mutually parallel, but slightly canted with respect to each other to provide a clamping force against a video cassette 19 installed in the tool 10. For example, in the presently described embodiment of the invention, see FIG. 2, the distance B is 2.75 centimeters; the distance A, 2.6 centimeters. An end portion 20 of the first leg 14 is cantilevered outward from the plane of the leg 14 to form a mounting bracket 22 parallel with the leg 14 and flanged at the end to fashion a shield stop 24. A shield latch 26 is affixed to the mounting bracket 22 by rivets 28, 30, and extends outward from the bracket 22 generally parallel with the legs 14, 16, the end 32 of the shield latch 26 being bent to form a locking notch 34.

The frame 12 of the tool 10 may be formed from an elongate strip of sheet metal stock sufficiently thick to provide a slight clamping pressure against the cassette 19 installed between the legs 14, 16 of the frame 12. The shield latch 26 is suitably formed from a thinner, more resilient metal such as spring steel. Alternatively, the tool 10 may be formed by injection molding from thermoplastic material such as nylon or polycarbonate, which may be filled to impart greater tensile strength and resilience.

Figure 3:
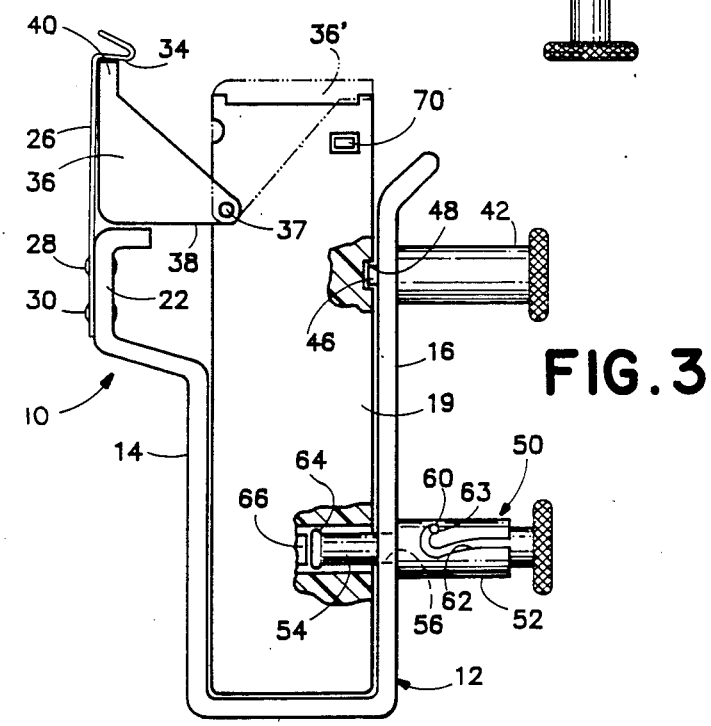
FIG. 3 is a side elevation of the tool of FIG. 1 showing a video tape cassette, partially broken away, installed in a tool according to the invention.

Referring to FIGS. 3 and 4, the video tape cassette 19 installed in the tool 10 includes a tape shield 36 attached to the housing of the cassette by hinge pins 37, the shield 36 being illustrated in the open position, and held open by the shield latch 26. The cassette 19 includes a spring mechanism (not shown) for automatically closing the tape shield 36. The closed position of the tape shield is shown in FIG. 3 by dashed lines 36'. In the open position, a face 38 of the shield abuts the shield stop 24, and the locking notch 34 of the shield latch 26 clips over the lip 40 of the shield holding the tape shield 36 open.

A handle 42 is affixed to the second leg 16 proximate to the end 44 of the leg and exteriorly of the U-shaped frame 12. The end 44 of the leg 16 is flanged outward, as illustrated, to guide the housing of the tape cassette 19 into the U-shaped frame 12. A locating pin 46, affixed to the leg 16 interiorly of the U-shaped frame 12, is positioned to be received into a location reference hole 48 formed in the housing of the video cassette.

Figure 2:
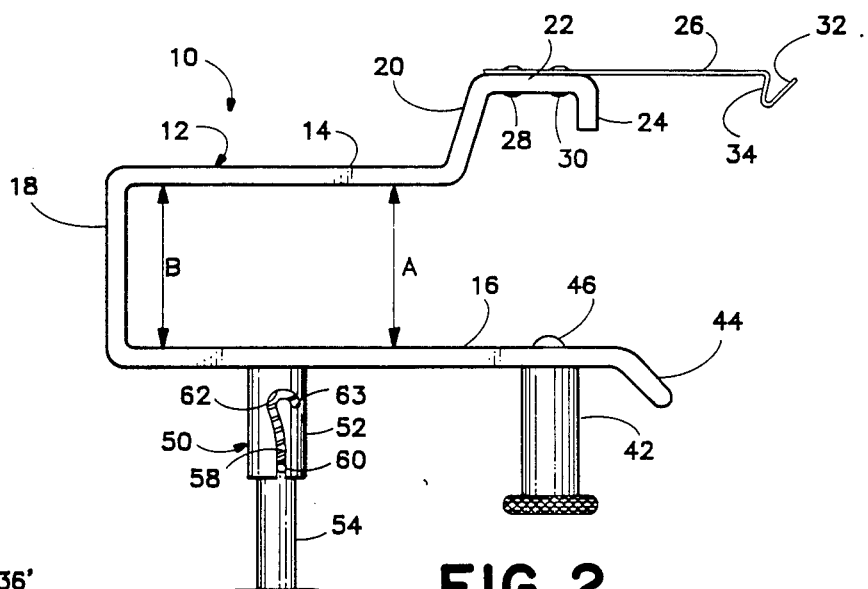
FIG. 2 is a side elevation of the tool of FIG. 1.

A lock release assembly 50 comprises a cylindrical sleeve 52 affixed exteriorly of the U-shaped frame to the leg 16, and a plunger 54 slidably engaged in the sleeve, the plunger 54 emerging into the central region of the bracket through an aperture 56 in the leg 16 when the plunger is depressed, as illustrated in FIG. 3. Referring to FIG. 2, the plunger passes through the central bore of a coil spring 58 disposed between the sleeve and the plunger, the coil spring bearing on the leg 16 and a pin 60 which protrudes laterally from the plunger 54 into a slot 62 formed in the sleeve. When the plunger is depressed, the slot, acting as a cam, guides the pin 60, first longitudinally with respect to the sleeve 52, then circumferentially as the plunger 54 rotates, forcing the pin into the locking end 63 of the slot, as illustrated in FIG. 3, where tension of the coil spring 58 of FIG. 2 retains and locks the plunger 54 in the engaged position. An end 64 of the plunger 54 engages and releases a locking mechanism 66 inside the video tape cassette 19. The end 64 is flared slightly to prevent the plunger from passing through the sleeve 52, thereby retaining the plunger inside the sleeve when the plunger is released.

In use, the tool 10 is held in one hand, by the handle 42; the cassette, in the other hand. The cassette is inserted into the U-shaped enclosure of the tool, oriented with the handle 42 on the same side of the cassette as exposed reel hubs 67, 68, and the tape shield up or outside the U-shaped clamp as illustrated in FIG. 4. The handle 42 provides leverage for spreading apart the legs 14, 16 of the tool while inserting the cassette. When the cassette is clamped firmly in the tool, the tape shield 36 is released by depressing a shield-lock release button 70 on the side of the cassette, whereupon the tape shield 36 may be opened and rotated to the position where the tape shield engages in the shield lock 26, as illustrated in FIGS. 3 and 4, thereby locking the tape shield 36 in the open position. After positioning the cassette 19 in the U-shaped clamp 10 and opening the shield, the tape reel hubs 67, 68 may be released for movement by depressing the plunger 54 into the cassette to unlock the hubs. After releasing the reel lock, the hubs 67, 68 can be rotated manually by inserting any suitable tool into one of the hubs and turning. With the tape shield 36 locked open and the reel hubs 67, 68 unlocked, magnetic tape 71 can be moved across the edge of the cassette for inspection, or the tape can be reeled off either reel for repair.

FIG. 5 illustrates one such tool 72 for turning the reels of the cassette, and having an elongate cylindrical handle 74 with longitudinal splines 76 at either end of the handle 74. One end of the tool may include six equally spaced apart splines 76 for insertion into the hubs of standard Beta format video cassettes, while the other end of the tool may have nine equally spaced apart splines 76 for insertion into the reel hubs of standard VHS format video cassettes. The ends of tool 72 are rounded to facilitate insertion of the tool into the cassette hubs. Alternatively, three splines 76 spaced apart 120 degrees around the periphery of the tool are suitable for insertion into the reel hubs of either VHS or Beta standard cassettes.

Referring to FIGS. 2–4, after inspection or repair of the magnetic tape, the reel hubs 67, 68 are locked again by retracting the plunger 54 from the cassette. The plunger 54 is released and retracted from the cassette by turning the plunger counterclockwise, thereby releasing the pin 60 from the locking end 63 of the slot 62, the plunger being retracted from the cassette under tension of the coil spring 58. The tape shield 36 is released by manually lifting the notch 34 of the shield latch 26, allowing the spring-loaded tape shield 36 to spring rotatably to the closed and locked position. The tool 10 is released by gently pulling the handle 42 away from the cassette 19, sufficiently to overcome the slight spring of the frame 12 and allow disengagement of the locating pin 46 from the location reference hole 48 of the cassette, whereupon the cassette can be slipped out of the tool 10.

The embodiment of the video tape cassette tool 10 described herein with reference to FIGS. 1–4 is suitable for holding a standard VHS format video tape cassette.

Referring to FIG. 6, an alternative embodiment of a video tape cassette tool 90 in accordance with the instant invention comprises a U-shaped frame 92 for receiving a video cassette, and a tape-shield latch 94 cantilevered from the frame 92 for holding a tape shield of the cassette in the open position. A handle 96 is attached to the frame to facilitate holding the cassette and to provide a lever for springing the frame 92 open while inserting the cassette therein. A lip 98 is provided at the end of the frame 92 adjacent the handle 96 for grasping and retaining the cassette inside the frame 92. The embodiment of FIG. 6 is suitable for holding standard Beta format video tape cassettes wherein the reels are automatically unlocked by opening the tape shield and not by depressing a separate locking mechanism 66 (FIG. 3) as required for VHS format tapes. Hence for Beta tapes the lock release assembly 50 is unnecessary.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. A hand tool for holding a video tape cassette of the type having a tape shield held closed by spring tension, said hand tool comprising:

means for clamping a video tape cassette into said hand tool; and means affixed to said clamping means for holding a tape shield of the cassette in an open position against the spring tension.

2. The hand tool of claim 1 wherein the video tape cassette includes a tape reel lock, said hand tool further comprising means attached to said clamping means for unlocking the tape reel lock of the video tape cassette.

3. The hand tool of claim 1 further comprising means affixed to said clamping means and engageable with the video tape cassette for locating said hand tool with respect to the video tape cassette.

4. The hand tool of claim 3 wherein the video tape cassette includes a tape reel lock, said hand tool further comprising means affixed to said clamping means a predetermined distance from said locating means for unlocking the tape reel lock of the video tape cassette.

5. The hand tool of claim 1 wherein said clamping means includes means attached to said clamping means for holding by hand said hand tool with the video tape cassette installed.

6. A tool for holding a video tape cassette of the type having a tape shield attached by hinges to a housing of the cassette and held closed by spring tension, the tape shield covering and protecting video tape inside the housing and being openable against the spring tension to an open position exposing the video tape, said tool comprising:

a U-shaped frame slidably insertable onto the housing of the video tape cassette, said frame holding said cassette; and a keeper attached to said U-shaped frame, said keeper receiving the tape shield in the open position thereof and holding the tape shield open against the spring tension.

7. The tool of claim 6 further comprising a handle affixed to said U-shaped frame.

8. The tool of claim 6 wherein said frame includes a flanged end for guiding movement of said U-shaped frame onto the cassette housing.

9. The tool of claim 6 wherein said frame includes a flanged end grasping an edge of the cassette housing.

10. The tool of claim 6 wherein the housing of the video tape cassette includes a locating reference hole formed therein, said tool further comprising a locating pin attached to said U-shaped frame, said locating pin being received in the locating reference hole to orient said tool with respect to the cassette.

11. The tool of claim 6 wherein the video tape cassette includes a tape-reel lock inside the housing, said tool further comprising a reel-lock release member attached to said U-shaped frame and insertable inside the cassette to release the tape-reel lock.

12. The tool of claim 11 further comprising a retainer for holding said reel-lock release member inside the cassette.

13. A tool for holding a video tape cassette of the type having a tape shield held closed by spring tension, said tool comprising:

a base member;

a first leg extending from one end of said base;

a second leg extending from another end of said base and forming a U-shaped clamp with said first leg and said base, said first and second legs being substantially parallel but slightly canted toward each other, the video tape cassette being received into the U-shaped clamp;

a handle affixed to said first leg remotely from said base and exteriorly of said U-shaped clamp; and a keeper cantilevered from said second leg, said keeper receiving and holding the tape shield of the video tape cassette in an open position against the spring tension.

14. The tool of claim 13 further comprising a locating pin affixed to said first leg interiorly of said U-shaped clamp, said locating pin being received into a reference hole of the video tape cassette for locating said tool with respect to the video tape cassette.

15. The tool of claim 13 wherein the video tape cassette is of the type having a reel lock inside the cassette, said tool further comprising a plunger slidably affixed to said first leg exteriorly of said U-shaped clamp, the plunger being insertable into the video tape cassette for releasing the reel lock.

16. The tool of claim 15 further comprising a retainer for holding the plunger inserted inside the video tape cassette.

* * * * *